(12) United States Patent
Tanaka

(10) Patent No.: US 8,259,324 B2
(45) Date of Patent: Sep. 4, 2012

(54) PRINTER/STORAGE INTEGRATE SYSTEM, CONTROLLER, CONTROL METHOD, AND CONTROL PROGRAM FOR AUTOMATIC INSTALLATION OF CONTROL SOFTWARE

(75) Inventor: Yoji Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1038 days.

(21) Appl. No.: 11/685,009

(22) Filed: Mar. 12, 2007

(65) Prior Publication Data
US 2007/0229884 A1 Oct. 4, 2007

(30) Foreign Application Priority Data

Mar. 23, 2006 (JP) ................................. 2006-081767

(51) Int. Cl.
*G06F 3/12* (2006.01)
(52) U.S. Cl. .................. 358/1.15; 370/242; 709/224
(58) Field of Classification Search ............ 358/1.15; 370/242; 709/224
See application file for complete search history.

(56) References Cited

U.S. PATENT DOCUMENTS

| | | | |
|---|---|---|---|
| 6,920,506 B2 | 7/2005 | Barnard et al. | |
| 2001/0040692 A1* | 11/2001 | Matsueda et al. | 358/1.14 |
| 2005/0138065 A1 | 6/2005 | Ciriza | |
| 2006/0114499 A1* | 6/2006 | Sumita et al. | 358/1.15 |

FOREIGN PATENT DOCUMENTS

| | | |
|---|---|---|
| JP | 06-266517 | 9/1994 |
| JP | 8-111691 A | 4/1996 |
| JP | 09-185474 A | 7/1997 |
| JP | 2001-243138 A | 9/2001 |
| JP | 2001-251362 A | 9/2001 |
| JP | 2002-185517 A | 6/2002 |
| JP | 2003-112465 | 4/2003 |
| JP | 2003-158522 A | 5/2003 |
| JP | 2003-337771 A | 11/2003 |
| JP | 2005-196757 A | 7/2005 |
| JP | 2005-215977 A | 8/2005 |

OTHER PUBLICATIONS

Japan Patent Application Publication 2002-185517 (IDS) (machine translation).*

* cited by examiner

*Primary Examiner* — Benny Q Tieu
*Assistant Examiner* — Qian Yang
(74) *Attorney, Agent, or Firm* — Dickstein Shapiro LLP

(57) ABSTRACT

A printer/storage integrated system, capable of using both printer and storage device from host devices with a single connection setting, is provided. A controller is connected with a first network with which host devices are connected, and a second network with which a printer and a storage device shared by the host devices are connected. The controller includes a communication relay unit which receives a control instruction or data transmitted from a host device over the first network, determines whether the destination of the control instruction or the data is either the printer or the storage device based on information included in the header of a communication protocol of the fourth layer or higher used in the transmission, and transfers the control instruction or the data to the printer or the storage device determined as the destination over the second network.

6 Claims, 10 Drawing Sheets

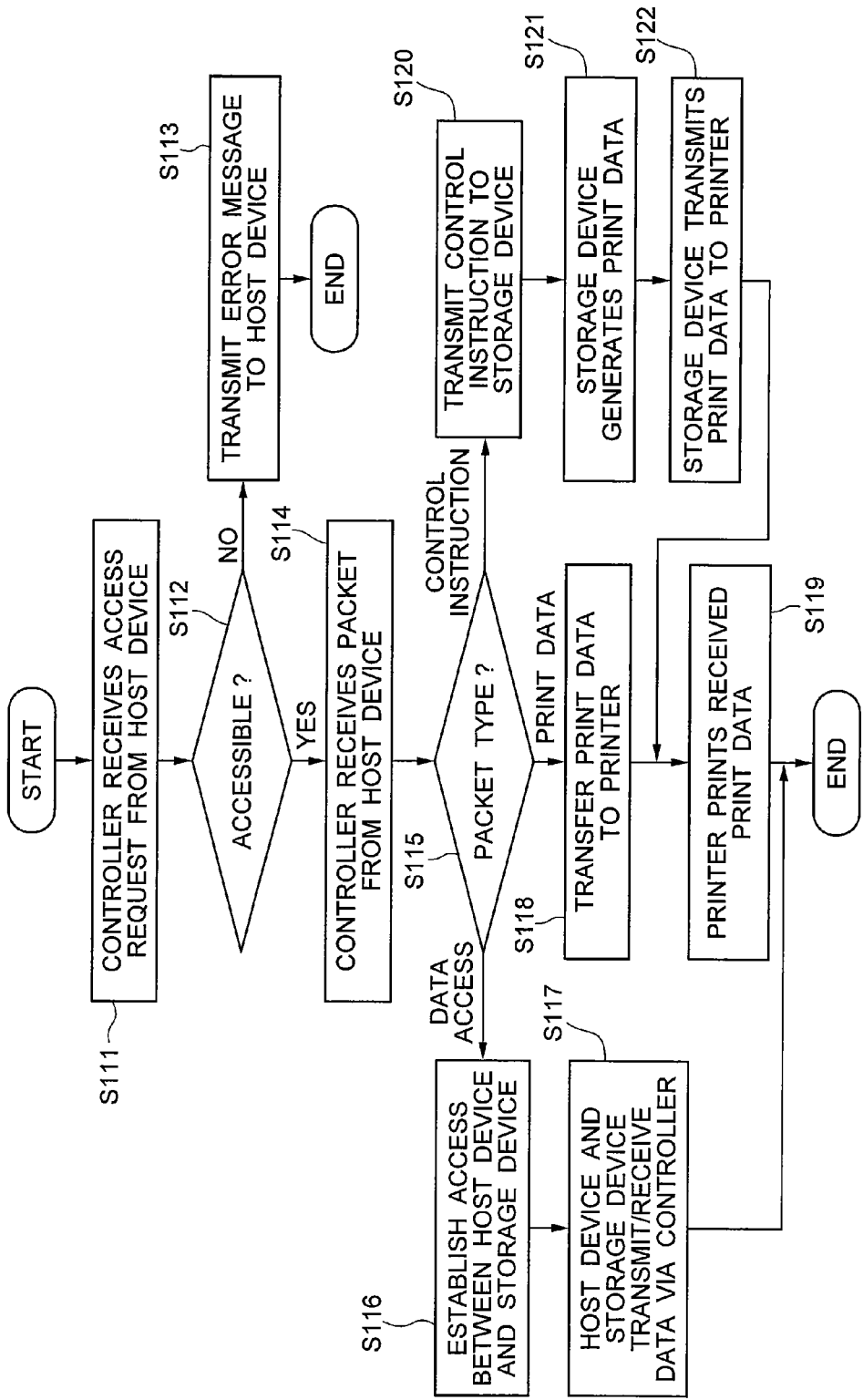

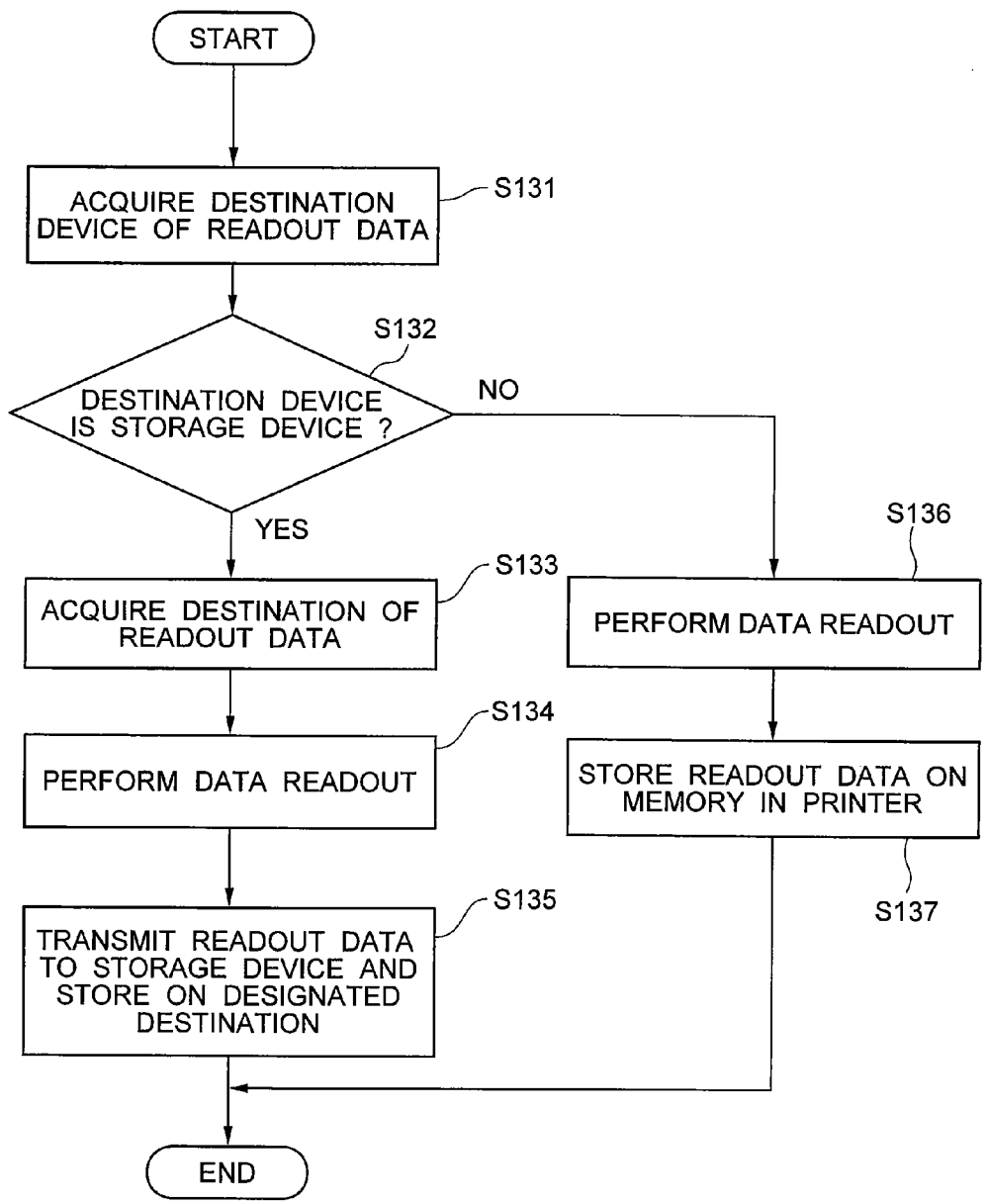

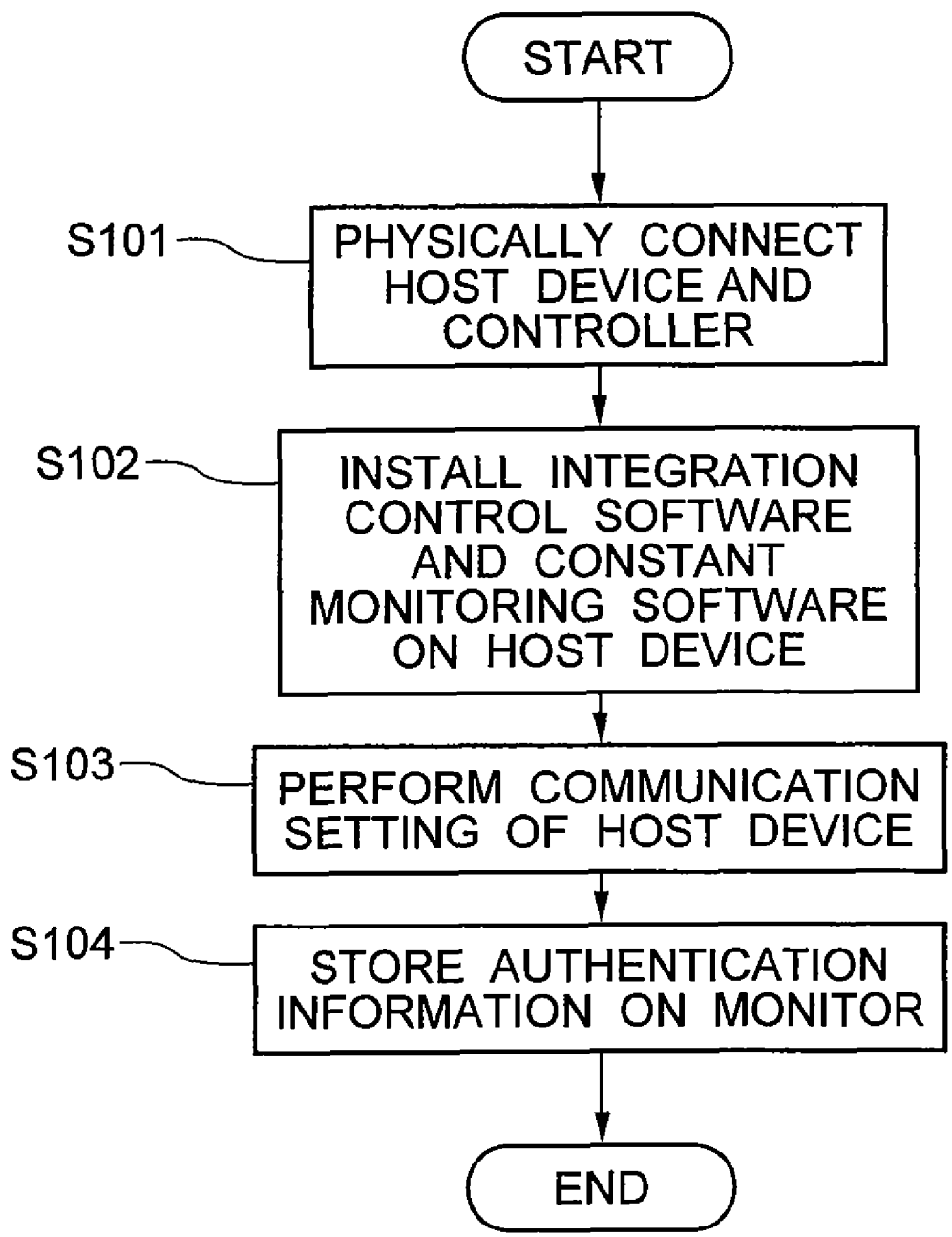

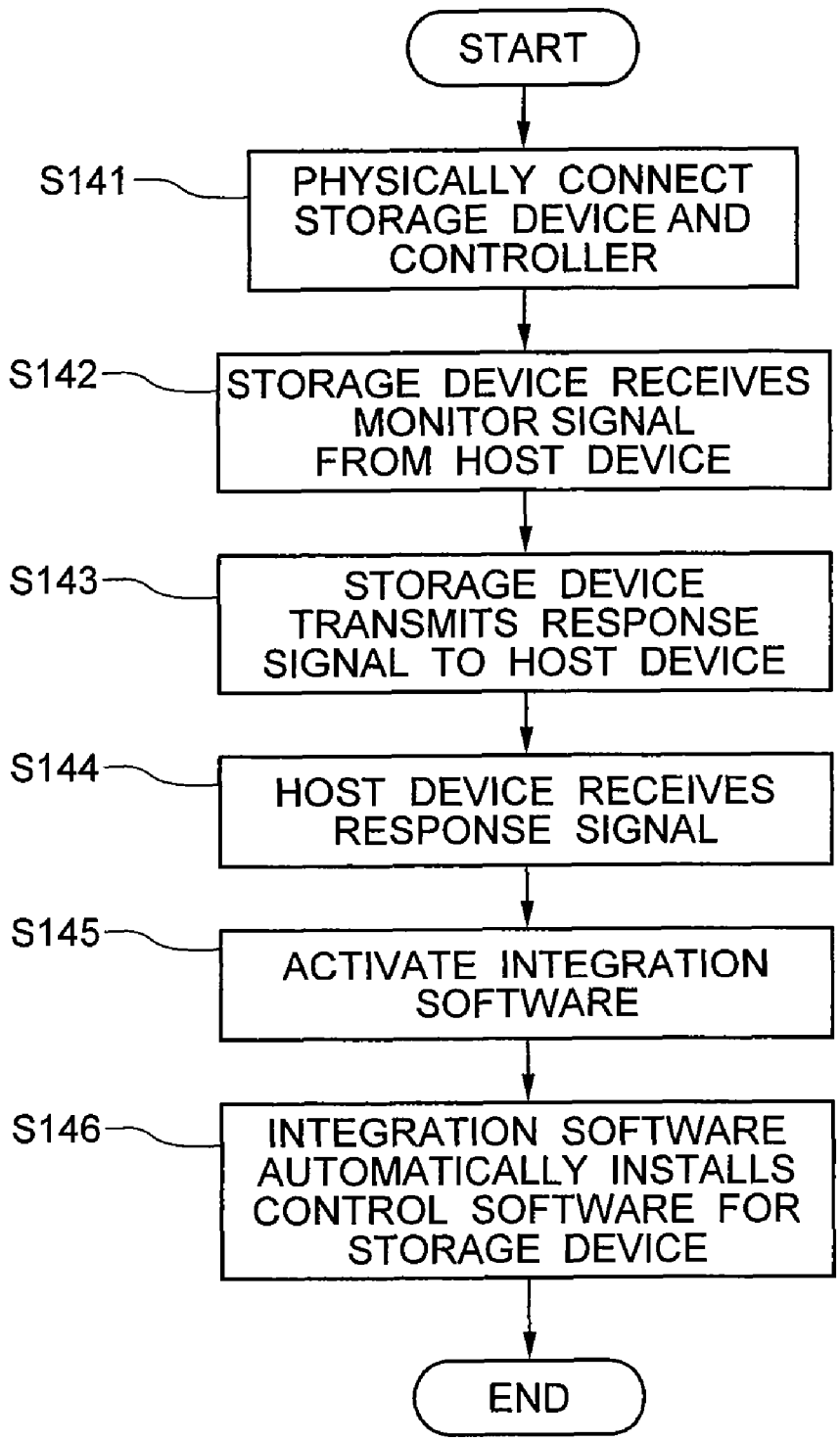

PRINTER/STORAGE INTEGRATE SYSTEM, CONTROLLER, CONTROL METHOD, AND CONTROL PROGRAM FOR AUTOMATIC INSTALLATION OF CONTROL SOFTWARE

BACKGROUND OF THE INVENTION

1. Field of the Invention

The present invention relates to an information processing system including a printer having a plurality of functions such as a scanner, a copying machine and a facsimile, and a storage device having a data storage function such as an NAS and a file server. In particular, the present invention relates to an integrated system in which control software for a printer and control software for a storage device are integrated, determining whether to print out data transmitted from a host device to the printer or to store it on the storage device.

2. Description of Related Art

Japanese Patent Application Laid-Open No. 6-266517 (Patent Document 1) describes an integrated network system for business including a printer and a file server machine (storage device).

This system is so configured that a file server machine is directly connected and a printer is connected via a print server machine with a LAN, and are shared by a plurality of workstations connected with the same LAN.

However, the conventional system involves the following problems.

A first problem is that communication means to the printer and the storage device must be prepared separately.

This is because controlling mechanisms of the printer and the storage device are provided to the respective devices. For example, if a network is connected with a LAN (Local Area Network), it is necessary to connect Ethernet cables ("Ethernet" is a registered trademark) to both the printer and the storage device, respectively.

A second problem is that in order to make the printer and the storage device usable by a user from a host device, it is required to perform installment of control software of the printer and the storage device, communication setting and customization to the host device. Further, if there is a system in a state where the printer or the storage device is connected with host devices, in order to add a storage device or a printer later, it is required to perform installment of control software for the printer and the storage device, communication setting, and customization to all host devices connected.

This is because controlling mechanisms of the printer and the storage device are provided to the respective devices. If the network OS (Operating System) operates in the printer and the storage device, it is required to perform installment of control software such as drivers for the printer and the storage device, network setting, and network drive setting to clients. This also applies to a case where a printer or a storage device is introduced into the system later.

A third problem is that an operational management policy must be determined for each of a printer and a storage device.

This is because a control mechanism is provided to each of a printer and a storage device. For example, security setting that to which user or to which host device accessibility is given must be set in both the printer and the storage device.

A fourth problem is that in order to operate both a printer and a storage device, a server device specially mounting a printer or a storage device and an OS controlling the device are required.

This is because there has been no means to operate both a printer and a storage device together. Therefore, although a server mounting a storage device is disposed for example, extra cost, wiring connection and settings are required.

SUMMARY OF THE INVENTION

In view of the above, it is an object of the present invention to provide a printer/storage integrated system and the like, capable of using both a printer and a storage device from host devices with a single connection setting.

A controller of the present invention is connected with a first network with which host devices are connected, and a second network with which a printer and a storage device shared by the host devices are connected. The controller includes a communication relay unit which receives a control instruction or data transmitted from a host device over the first network, determines whether the destination of the control instruction or the data is either the printer or the storage device based on information included in the header of a communication protocol of the fourth layer or higher used in the transmission, and transfers the control instruction or the data to the printer or the storage device determined as the destination over the second network.

According to the controller, the communication relay unit determines the transfer destination of a control instruction or data based on header information of a communication protocol of the fourth layer or higher.

Therefore, the host device is only necessary to transmit the control instruction or the data to a network address of the first network side of the controller when using either the printer or the storage device. In other words, a host device can use both the printer and the storage device with a single connection setting.

In the controller, the communication relay unit may perform the determination based on the type of a communication protocol of the application layer used in the transmission.

Between the case of using a printer and the case of using the storage device, a communication protocol of the application layer to be used is different generally. Therefore, with this configuration, the communication relay unit can accurately determine the transfer destination of the received control instruction or data.

In the controller, the communication relay unit may perform the determination based on the destination port number of the TCP or the UDP used in the transmission.

The port number of the TCP (Transmission Control Protocol) or the UDP (User Datagram Protocol) used by server software is often disclosed. Therefore, with this configuration, the communication relay unit can accurately determine the transfer destination of the received control instruction or data.

The controller may further include an authentication unit which authenticates an access to the printer or the storage device by a host device based on authentication information previously set for a user of the host device. Further, the authentication information may be stored on the controller.

With this configuration, it is possible to apply a management policy common to the printer and the storage device.

The controller may be built in the casing of either the printer or the storage device.

With this configuration, it is easily possible to add the other device to a system including host devices and either a printer or a storage device. Further, system maintenance can be easy.

A printer/storage integrated system of the present invention includes: host devices connected with a first network; a printer and a storage device connected with a second network and shared by the host devices; and a controller which is connected with the first network and the second network and controls the printer and the storage device. The controller has a communication relay unit which receives a control instruction or data transmitted from a host device over the first network, determines whether the destination of the control instruction or the data is either the printer or the storage device based on information included in the header of a communication protocol of the fourth layer or higher used in the transmission, and transfers the control instruction or the data to the printer or the storage device determined as the destination over the second network.

According to the printer/storage integrated system, the communication relay unit determines the transfer destination of a control instruction or data based on header information of a communication protocol of the fourth layer or higher.

Therefore, the host device is only necessary to transmit the control instruction or the data to a network address of the first network side of the controller when using either the printer or the storage device. In other words, a host device can use both the printer and the storage device with a single connection setting.

In the printer/storage integrated system, the communication relay unit may perform determination based on the type of a communication protocol of the application layer used in the transmission.

Between the case of using a printer and the case of using the storage device, a communication protocol of the application layer to be used is different generally. Therefore, with this configuration, the communication relay unit can accurately determine the transfer destination of the received control instruction or data.

In the printer/storage integrated system, the communication relay unit may perform the determination based on the destination port number of TCP or UDP used in the transmission.

The port number of TCP or UDP used by server software is often disclosed. Therefore, with this configuration, the communication relay unit can accurately determine the transfer destination of the received control instruction or data.

In the printer/storage integrated system, the controller may further include an authentication unit which authenticates an access to the printer or the storage device by a host device based on authentication information previously set for the user of the host device. The authentication information may be stored on the controller.

With this configuration, it is possible to apply a management policy common to the printer and the storage device.

In the printer/storage integrated system, the controller may be built in the casing of either the printer or the storage device.

With this configuration, it is easily possible to add the other device to a system including host devices and either a printer or a storage device. Further, system maintenance can be easy.

In the printer/storage integrated system, the host device may include a setting unit which installs control software for the printer and control software for the storage device collectively.

With this configuration, it is possible to realize laborsaving in the setting operation of the host device when constructing the system.

In the printer/storage integrated system, the host device may include: a monitoring unit which transmits a monitor packet to the printer and the storage device; and an automatic setting unit which operates when receiving a response packet corresponding to the monitor packet from the printer or the storage device added to the printer/storage integrated system, and installs control software corresponding to the model type of the printer or the storage device added, on the host device.

With this configuration, when a printer or a storage device is added to the operating printer/storage integrated system, it is automatically set that host devices can use the added device without a special operation by the user.

A control method of the present invention controls a printer and a storage device by: receiving, by a controller, a control instruction or data transmitted from the host device over the first network; determining whether the destination of the control instruction of the data is either the printer or the storage device, based on information included in the header of a communication protocol of the fourth layer or higher used in the transmission; and transferring the control instruction or the data to the printer or the storage device determined as the destination over the second network.

According to the control method, the transfer destination of a control instruction or data is determined based on header information of a communication protocol of the fourth layer or higher.

Therefore, a host device is only necessary to transmit the control instruction or the data to a network address of the first network side of the controller when using either the printer or the storage device. In other words, a host device can use both the printer and the storage device with a single connection setting.

A control program of the present invention controls a printer and a storage device by causing a computer to perform: a function of receiving a control instruction or data transmitted from a host device over the first network; a function of determining whether the destination of the control instruction of the data is either the printer or the storage device, based on information included in the header of a communication protocol of the fourth layer or higher used in the transmission; and a function of transferring the control instruction or the data to the printer or the storage device determined as the destination over the second network.

EFFECTS OF THE INVENTION

According to the present invention, the destination of a control instruction or data is determined based on header information of a communication protocol of the fourth layer or higher.

Therefore, even in the case of using either a printer or a storage device, a host device is only necessary to transmit a control instruction or data to the network address on the first network side of the controller. In other words, a host device can use both the printer and the storage device with a single connection setting.

BRIEF DESCRIPTION OF THE DRAWINGS

FIG. 5 is a flowchart showing operation of a printer/storage integrated system;

FIG. 6 is a flowchart showing operation of a printer/storage integrated system;

FIG. 7 is a flowchart showing a construction procedure of a printer/storage integrated system;

FIG. 8 is a flowchart showing the operation when a storage device is added to a printer/storage integrated system;

DESCRIPTION OF PREFERRED EMBODIMENT

Hereinafter, configuration and operation of a printer/storage integrated system 10, which is an embodiment of the present invention, will be described with reference to the drawings.

Figure 1:
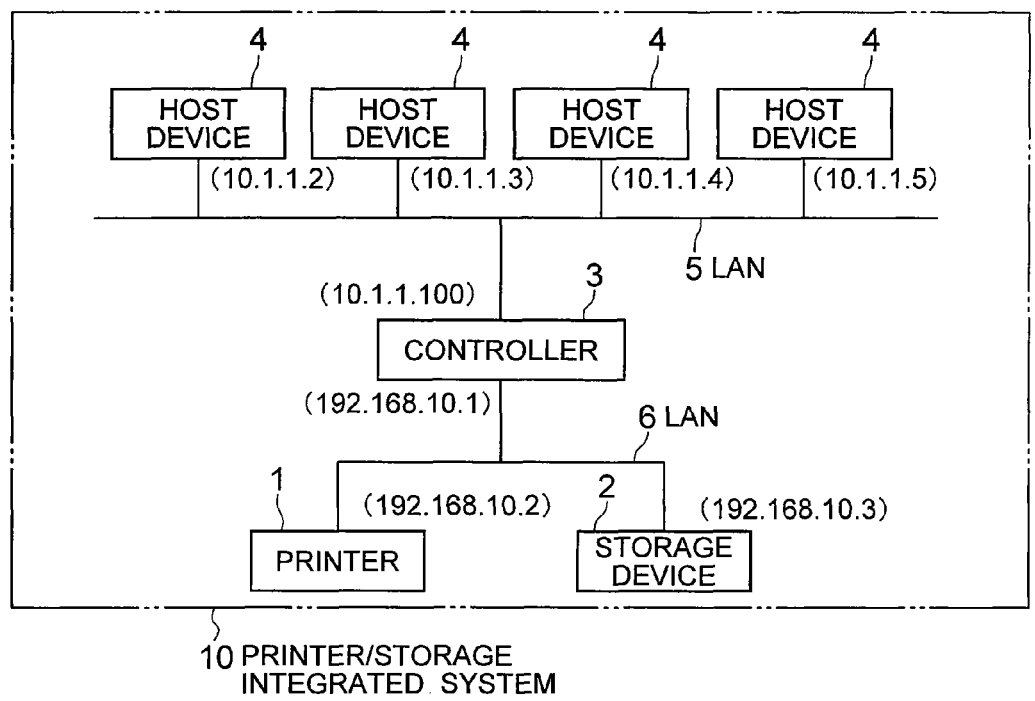
FIG. 1 is a configuration diagram of a printer/storage integrated system which is a first embodiment of the present invention.

FIG. 1 is a configuration diagram of the printer/storage integrated system 10.

The printer/storage integrated system 10 includes a printer 1, a storage device 2, a controller 3, and a plurality of host devices 4.

The printer 1 is one called "complex machine" type having a copying function, a scanner function and a facsimile transmitting/receiving function besides a printing function, and is connected with a LAN 6.

The storage device 2 is a device having a storage area shared by host devices 4 such as a hard disk device connected with a SAN (Storage Area Network) and a disk array device, and is connected with the LAN 6.

The controller 3 is connected with both LAN 5 and LAN 6. The controller 3 transfers control instructions and data transmitted from the host devices 4 to the printer 1 or the storage device 2, and controls both devices. The controller 3 may be an independent device or built in the casing of the printer 1 or the storage device 2.

The host device 4 is a personal computer for example, and is connected with the LAN 5. The host device 4 utilizes various functions held by the printer 1 and the storage device 2 via the controller 3.

On the LAN 5 and LAN 6, TCP/IP (Transmission Control Protocol/Internet Protocol) is used as a communication protocol of a network layer and a transport layer. To each device described above, an IP address shown in parentheses in FIG. 1 is allocated, respectively.

The controller 3 has a communication relay unit 32 (details will be described later), so the host devices 4 do not need to designate the IP address (192.168.10.2 or 192.168.10.3) of the printer 1 or the storage device 2 in order to communicate with it. The host device 4 designates the IP address (10.1.1.100) on the LAN 5 side of the controller 3 when communicating with either device.

Note that the system configuration shown in FIG. 1 is an example, so the number of host devices 4 constituting the printer/storage integrated system is not limited. Further, a plurality of printers 1 and storage devices 2 may be provided. Further, the communication protocol to be used is not limited to TCP/IP.

Figure 2:
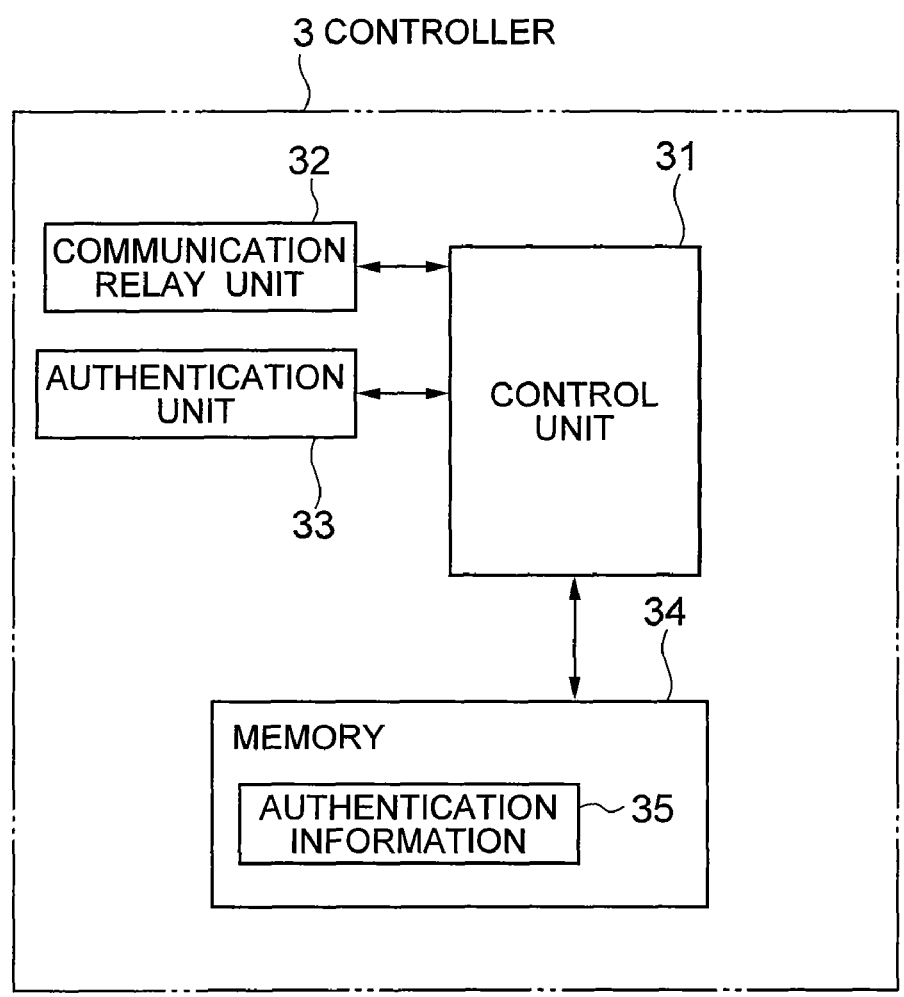
FIG. 2 is a function block diagram of a controller.

FIG. 2 is a function block diagram of the controller 3.

The controller 3 includes a control unit 31, a communication relay unit 32, an authentication unit 33 and a memory 34.

The control unit 31 is so realized that a CPU in the controller 3 executes the OS, and performs basic controls such as memory management and task management.

The communication relay unit 32 relays communications between the host devices 4 and the printer 1 or the storage device 2.

More specifically, when print data is transmitted from a host device 4, the communication relay unit 32 directly transmits the received print data to the printer 1. Determination whether the received data is print data or not is performed by checking the protocol type of the application layer or the destination port number of TCP or UDP. For example, in TCP/IP, when the communication relay unit 32 receives a packet of a protocol such as LPR (Line PRinter daemon protocol) or IPP (Internet Printing Protocol) from the host device 4, it transmits the packet to the printer 1 directly. When the communication relay unit 32 receives a packet of RAW protocol from the host device 4, if the destination port number of TCP is 515 or 9100, it transmits the packet to the printer 1 directly.

When the host device 4 performs saving, deletion, editing and execution of data stored on the storage device 2, the communication relay unit 32 establishes an access for exchanging data between the host device 4 and the storage device 2. For example, in TCP/IP, if the communication relay unit 32 receives a packet using a protocol such as NFS (Network File System), CIFS (Common Internet File System), FTP (File Transfer Protocol), HTTP (HyperText Transfer Protocol) or the like from external equipment, it transmits the packet to the storage device 2 and establishes an access for exchanging data between the host device 4 and the storage device 2.

The memory 34 consists of RAM (Random Access Memory) for example, and stores authentication information 35.

The authentication information 35 includes user names on the system previously set for the respective users of the host devices 4 and passwords corresponding thereto.

The authentication information 35 may be prepared separately for the printer 1 and the storage device 2 respectively, or shared.

The authentication unit 33 refers to the authentication information 35 previously stored on the memory 34, processes an authentication request received from the host device 4, and restricts an access by the host device 4 to the printer 1 or the storage device 3. For example, the authentication unit 33 searches the authentication information 35 for the user name transmitted from the host device 4, and determines accessibility depending on whether the password stored corresponding thereto coincides with the one transmitted from the host device 4.

Figure 3:
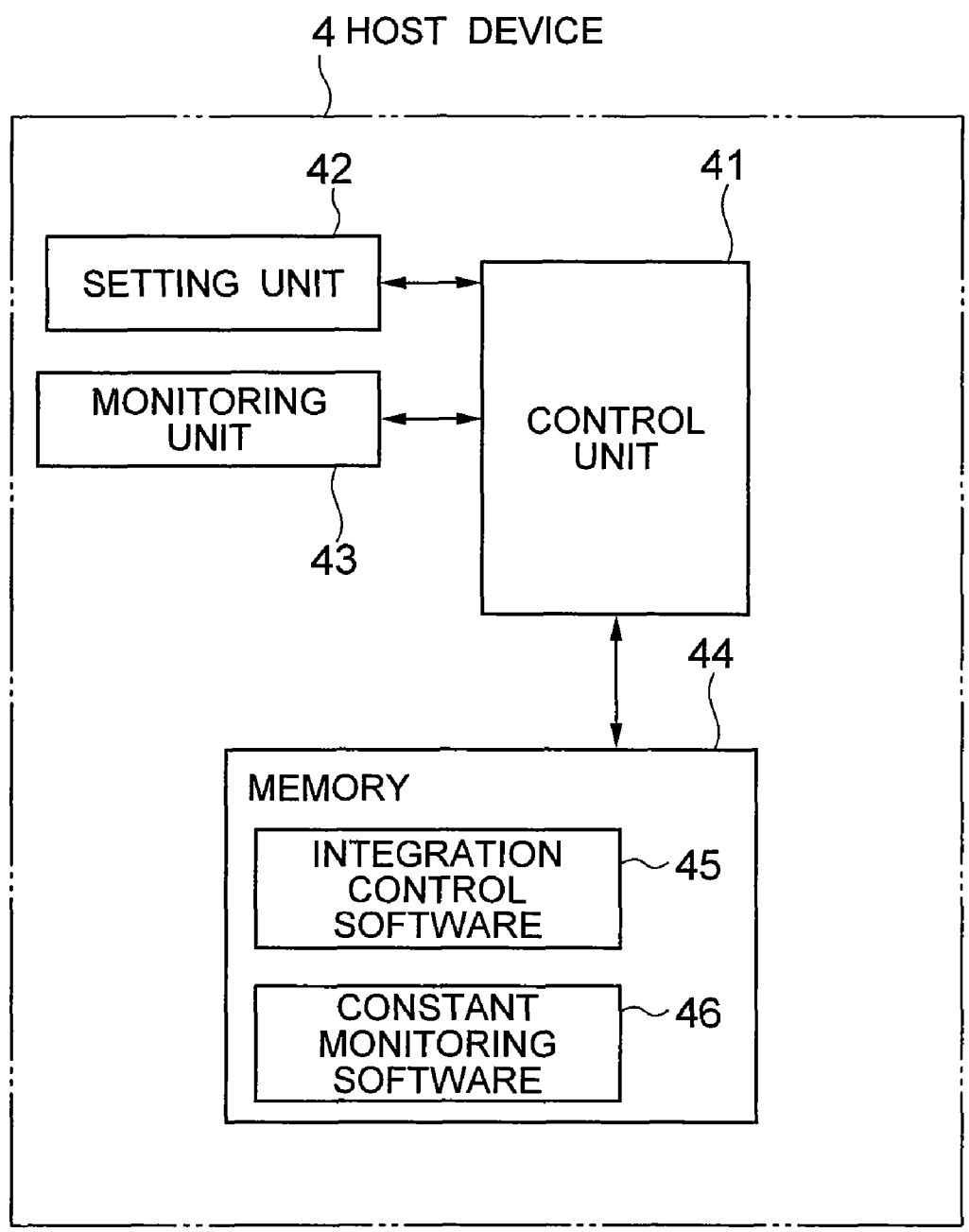
FIG. 3 is a function block diagram of a host device.

FIG. 3 is a function block diagram of the host device 4.

The host device 4 includes a control unit 41, a setting unit 42, a monitoring unit 43 and a memory 44.

The control unit 41 is so realized that a CPU held by the host device 4 executes the OS for example, and performs basic controls such as memory management and task management.

The setting unit 42 collectively installs software for controlling the printer 1 and the storage device 2, that is, device driver and utility software for setting for example, on the host device 4 when configuring the printer/storage integrated system 10.

Further, if another printer 1 or storage device 2 is added after the printer/storage integrated system 10 is operated, the setting unit 42 automatically installs control software or the like for the added device to the host device 4.

The monitoring unit 43 transmits a monitor packet to the printer 1 and the storage device 2 and receives a response to the packet to thereby detect another printer 1 or storage device 2 when it is added to the printer/storage integrated system 10. When the monitoring unit 43 detects that another printer 1 or storage device 2 is added, it activates the setting unit 42.

The memory 44 consists of a RAM for example, and stores integration control software 33 and constant monitoring software 46. When the CPU executes the software, the setting unit 42 and the monitoring unit 43 are realized.

Figure 4A:
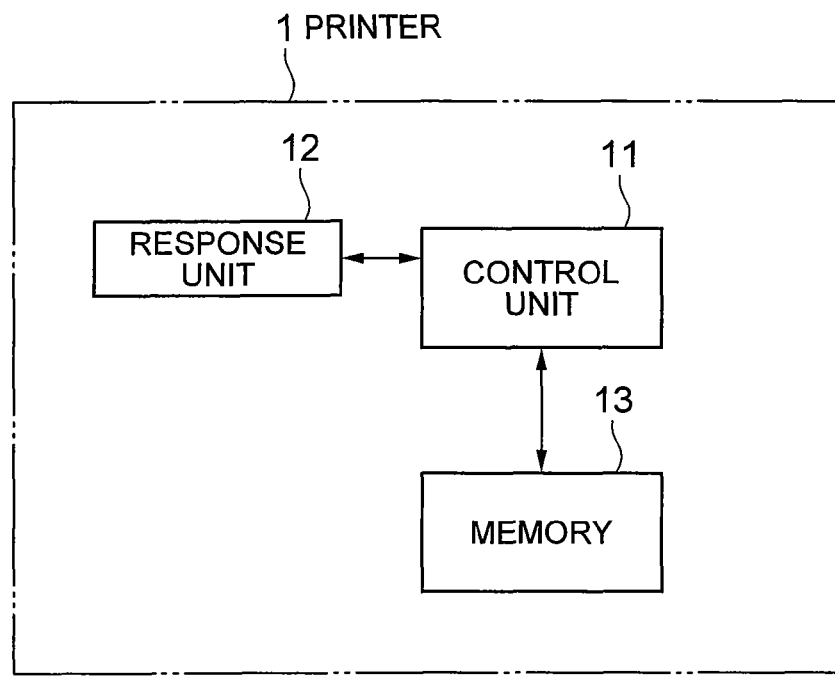
FIG. 4A is a function block diagram of a printer.

FIG. 4A is a function block diagram of the printer 1.

The printer 1 includes a control unit 11, a response unit 12, and a memory 13.

The controller 11 is so realized that the CPU held by the printer executes the OS for example, and performs basic controls such as memory management and task management.

The response unit 12 transmits a response packet when it receives a monitoring packet transmitted from the setting unit 42 of the host device. A response packet includes information indicating the model type of the printer 1.

The memory 13 consists of a RAM for example, and stores image data generated by the scanner function held by the printer 1.

Figure 4B:
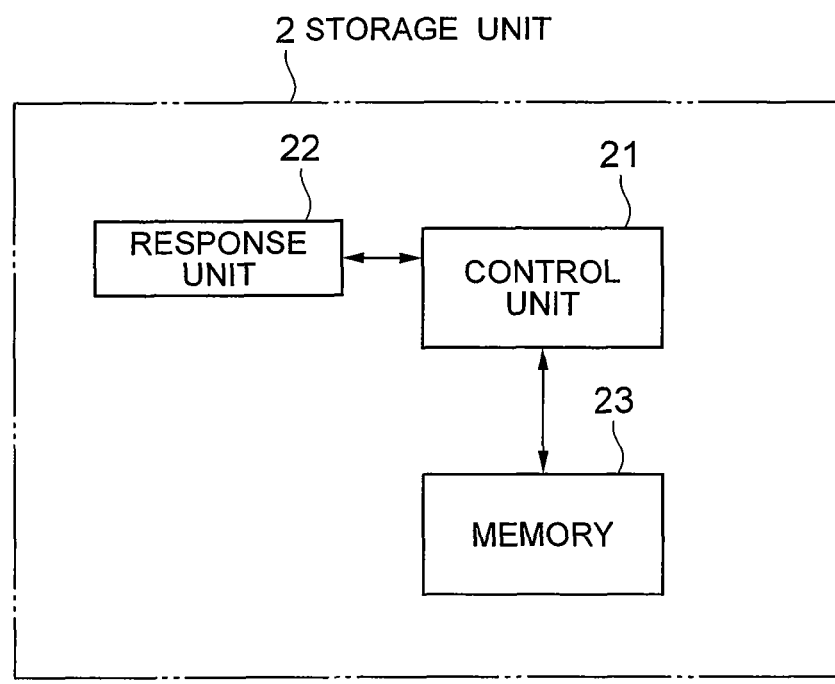
FIG. 4B is a function block diagram of a storage device.

FIG. 4B is a function block diagram of the storage device 2.

The storage device 2 includes a control unit 21, a response unit 22 and a memory 23.

The controller 21 is so realized that the CPU held by the storage device executes the OS for example, and performs basic controls such as memory management and task management.

The response unit 22 transmits a response packet when it receives a monitoring packet transmitted from the setting unit 42 of the host device. A response packet includes information indicating the model type of the storage device 2.

The memory 23 consists of a hard disk device for example, and has a memory area shared by the host devices 4.

FIG. 5 is a flowchart showing operation of the printer/storage integrated system 10.

When the controller 3 receives an access request to the printer 1 or the storage device 2 transmitted from the host device 4 (S111), the authentication unit 32 compares authentication information included in the received packet with the authentication information 35 stored on the memory 34 to thereby determine whether the user of the host device 4 transmitting the packet has accessibility (S112). If the authentication unit 32 determined that that user has no accessibility, it sends back an error message indicating the authentication was failed to the host device 4 which is the sender, and ends the processing (No in S112, S113).

If the authentication unit 32 determined that the user has accessibility, the communication relay unit 33 receives a packet including a control instruction or data to the printer 1 or the storage device 2 transmitted from the host device 4 (Yes in S112, S114), and determines the type of the packet (S115). This determination is performed by checking the protocol type of the application layer of the packet or destination port number of TCP or UDP.

If the packet type is an access request to the data stored on the storage device 2, the communication relay unit 32 establishes connection between the host device 4 and the storage device 2 (S116). Then, the host device 4 and the storage device 2 perform transmission and reception of data via the controller 3, and perform desired processing such as file saving on the storage device 2 (S117).

If the packet type is determined as print data, the communication relay unit 32 transfers the print data to the printer 1 (S118) The printer 1 prints the received print data (S119).

If the packet type is determined as a control instruction to the storage device 2, the communication relay unit 22 transmits the control instruction to the storage device 2 (S120). The storage device 2 which received the control instruction generates print data (S121), and transmits it to the printer 1 (S122). The printer 1 prints the print data received (S119).

FIG. 6 is a flowchart showing the operation of the printer/storage integrated system 10 when a user takes in data by using the scanner function of the printer 1.

The printer 1 acquires information indicating the destination device of readout data inputted by the user through an input device such as a touch panel (S131). The printer 1 determines whether the destination device is the storage device 2 (S132).

If the destination device is the storage device 2 (Yes in S132), the printer 1 acquires the destination of the readout data inputted by the user, that is, directory name where the data is to be saved for example (S133), and performs readout of the data according to the manipulation of the user (S134). Then, the printer 1 transmits the readout data to the storage device 2 and stores it on the data destination acquired in S133.

If the destination is a memory of the printer 1 (No in S132), the printer 1 performs readout of the data according to the manipulation of the user (S136), and stores the readout data on the memory (S137).

FIG. 7 is a flowchart showing install procedure of the printer/storage integrated system 10. It is assumed that the host devices 4 and the LAN 5 have been operated.

First, only one physical connection from a host device 4 to the controller 3 is established. Further, the printer 1 and the storage device 2 are also physically connected with the controller 3, respectively (S101). Thereby, operation of physical connection is completed.

Next, integration control software including control software (e.g., device driver, setting utility software) for the printer 1 and the storage device 2 respectively and constant monitoring software for detecting a printer or a storage device newly introduced to the system are installed to the host devices 4 (S102). With the integration control software, a user can complete installation of the control software for the printer 1 and storage device 2 with only one installation.

Then, communication setting for the host device 4 to perform communications with the printer 1 and the storage device 2 is performed (S103). The communications are controlled by the controller 3, so it is only necessary to establish connection with the controller 3. Therefore, by setting one IP address, that is, an IP address (10.1.1.100) on the LAN 5 side of the controller 3 in the example of FIG. 1, the operation of S103 is completed.

Next, the authentication information 35 is written on the memory 34 of the controller 3 (S104). If there is a printer or a storage device which has been operated and authentication information is saved, the information may be copied to the controller so as to be taken over.

Through these steps, the host device 4 can print by using the printer 1, and save, delete, edit or execute data by using the storage device 2.

Further, the method of using the printer 1 and the storage device 2 may be customized in accordance with a request from the user.

Figure 9:
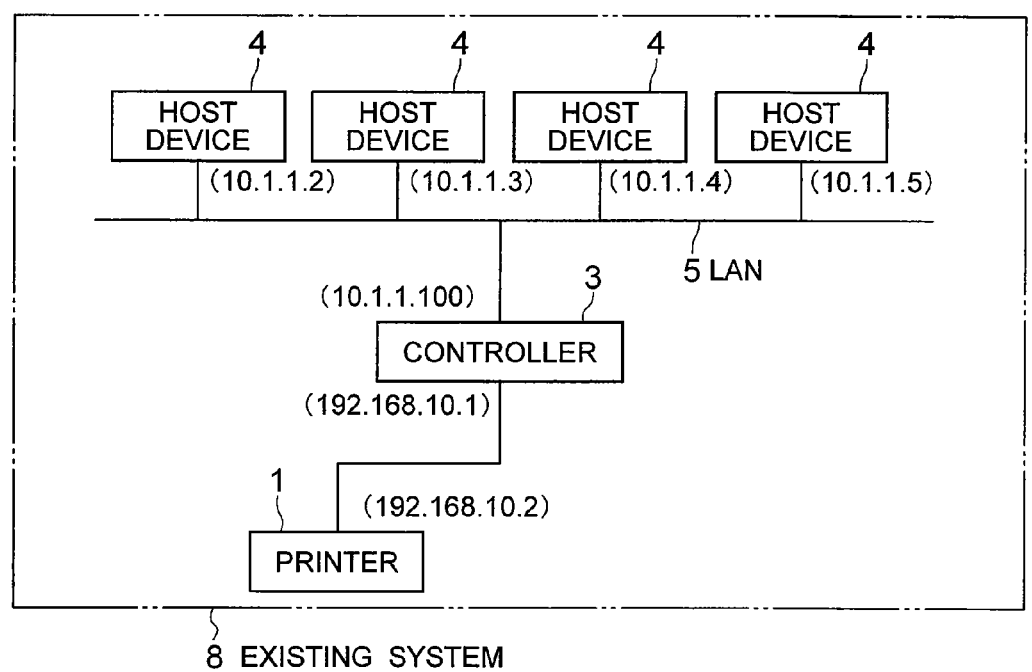
FIG. 9 is a diagram showing the configuration of an existing system including a host device, a printer and a controller.

FIG. 8 is a flowchart showing an operation when the storage device 2 is added to the printer/storage integrated system 1 which has been operated. This operation is same in the case of adding the storage device 2 to an existing system 7 including the printer 1, the controller 3 and the host devices 4, as shown in FIG. 9.

When physically connecting the newly introduced storage device 2 with the controller (S141), the storage device 2 receives a monitor signal transmitted from constant monitor software constantly operated in the host device 4 (S142).

The storage device 2 transmits a reply signal corresponding to the monitor signal to the host device 4 via the controller 3

(S143), and the host device 4 receives it (S144). The reply signal includes information to identify the model type of the storage device 2 added.

The constant monitoring software activates the integration control software (S145), and the integration software automatically installs control software corresponding to the model type of the storage device 2 (S146).

Even in the case that the configuration of the system operated and the type of added equipment are different from the example described above, control software corresponding to the added equipment is automatically installed in the same manner as described above.

Next, explanation will be given for an operating procedure in the case of adding the controller 3 and the storage device 2 to the existing system 7 in which the printer 1 and the host devices 4 are connected with the LAN 5 shown in FIG. 10A. In this case, it is assumed that the controller 3 is built in the casing of the storage device 2. Further, in the existing system 7, it is assumed that IP addresses 10.1.1.2 to 10.1.1.5 are allocated to the host devices 4, and an IP address 10.1.1.100 is allocated to the printer 1, respectively.

First, to an interface and the storage device 2 to be connected with the storage device 2 of the controller 3, IP addresses having network addresses different from that of the LAN 5 are set (e.g., 192.168.10.1 and 192.168.10.3).

Next, the IP address 10.1.1.100 set to the printer 1 is set to the interface of the host device 4 side of the controller 3. The IP address of the printer 1 is changed to one having the same network address as the storage device 2 (e.g., 192.168.10.2).

Then, the host device 4 and the printer 1 are physically connected to the controller 3, respectively.

Figure 10A:
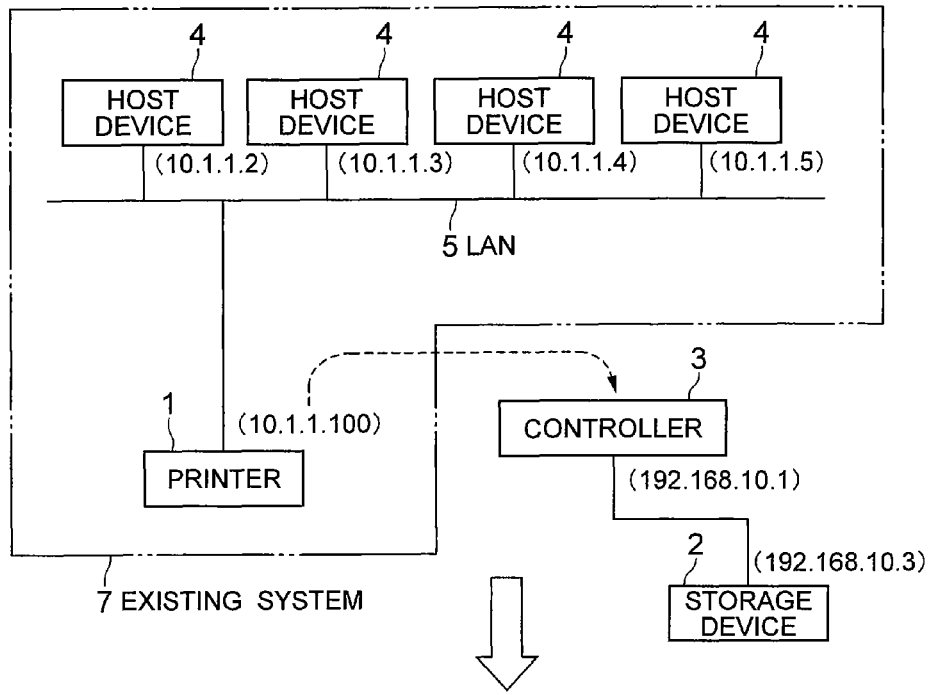
FIGS. 10A, 10B are diagrams illustrating a procedure to configure a printer/storage integrated system by adding a controller and a storage device to the existing system including a host device and a printer.
Figure 10B:
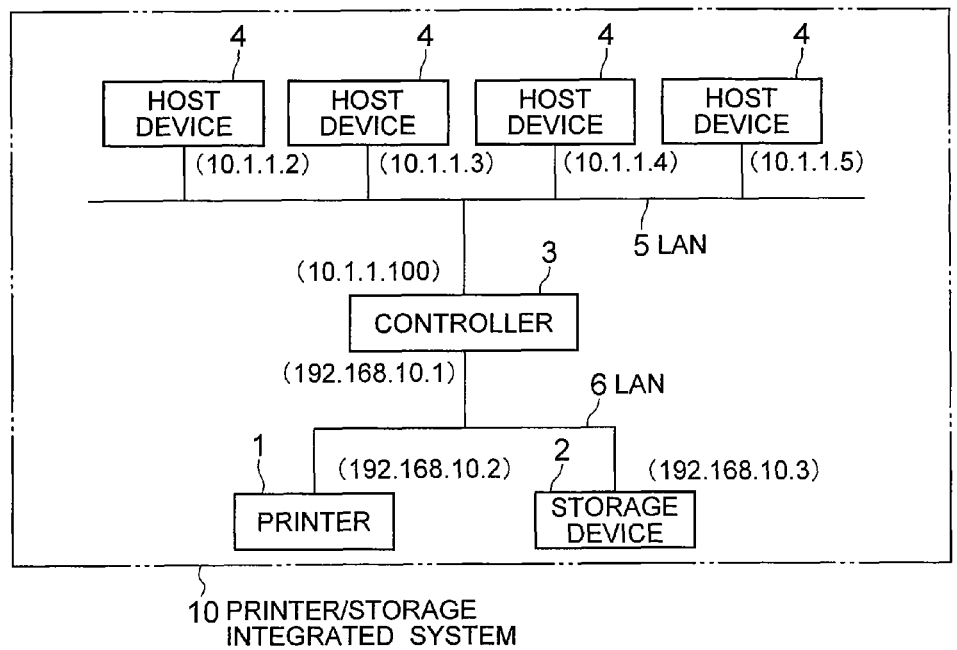

Through the simple operation as described above, the printer/storage integrated system 10 shown in FIG. 10B can be configured. Further, since the IP address on the LAN 5 side of the controller 3 takes over 10.1.1.100 allocated to the printer 1, the printer 1 can be used via the controller 3 without changing the settings of the host device 4.

In other words, it is possible to additionally install the controller 3 and the storage device 2 to the existing system not having the controller 3 easily.

Therefore, a user not requiring the storage device 2 at least for a while can construct the system as shown in FIG. 10A so as to suppress initial investment, and when the storage device 2 is required, the user can add the controller 3 and the storage device 2 easily so as to expand the system to the printer/storage integrated system 10 as shown in FIG. 10B.

According to the printer/storage integrated system 10, the communication relay unit 32 determines the destination of a control instruction or data based on header information of a communication protocol of the fourth layer or higher.

Therefore, even in the case of using either the printer 1 or the storage device 2, the host device 4 can transmit a control instruction or data by using the IP address on the LAN 5 side of the controller 3 as the destination. In other words, the host device can use both the printer 1 and the storage device 2 with a single connection setting.

According to the printer/storage integrated system 10, the controller 3 stores the authentication information 35 on the memory 34, and based on the authentication information, the authentication unit 33 controls an access by the host device 4 to the printer 1 and the storage device 2.

Therefore, a management policy common to the printer and the storage device can be applied.

In the printer/storage integrated system 10, if the controller 3 is built in the casing of the printer 1 or the storage device 2 or is arranged at a physically near location, it is possible to add the other device to a system including the host devices 4 and either one of the printer 1 and the storage device 2. This enables to make system maintenance easy.

According to the printer/storage integrated system 10, the host device 4 includes the setting unit 42 which is realized by carrying out the integration control software 45. Therefore, laborsaving can be realized in setting operation of the host devices 4 when configuring the system.

According to the printer/storage integrated system 10, the monitoring unit 43 of the host device 4 can detect a printer or a storage device added to the system, by receiving a response packet from the printer 1 or the storage device 2.

Therefore, it is possible to automatically install control software for the added device by automatically operating the setting unit 42.

What is claimed is:

1. A printer-and-storage integrated system, comprising:
host devices connected with a first network;
a printer and a storage device connected with a second network, each of the printer and the storage device being shared by the host devices; and
a controller which is connected with the first network and the second network, the controller transferring a control instruction or data transmitted from the host devices to the printer or the storage device and controlling the printer and the storage device,
wherein the controller includes a communication relay unit which receives a control instruction or data transmitted from the host devices via the first network, determines whether destination of the control instruction or the data is either the printer or the storage device based on information included in a header of a communication protocol of a fourth layer or higher used in the transmission, transfers the control instruction or the data to the printer or the storage device determined as the destination over the second network, and transfers a response to the control instruction from the printer or the storage device to the host devices via the first network,
wherein each host device includes:
a monitoring unit which transmits a monitor packet to the second network via the controller, and receives a response packet to the monitor packet to thereby detect an added printer or an added storage device added to the printer-and-storage integrated system; and
an automatic setting unit which operates when the monitoring unit detects that another printer or storage device is added to the printer-and-storage integrated system upon receiving the response packet, and installs control software corresponding to a model type of the added printer or the added storage device, on the host device,
the automatic setting unit of the host device installs the control software for the added printer and the software for the added storage device collectively, and wherein the controller takes over an IP address allocated to either of the added printer or the added storage device which has been connected to the first network, and allocates a new IP address to the added printer and the added storage device.

2. The printer-and-storage integrated system, according to claim 1, wherein the communication relay unit performs the determination based on a type of a communication protocol of an application layer used in the transmission.

3. The printer-and-storage integrated system, according to claim 1, wherein the communication relay unit performs the determination based on destination port number of TCP or UDP used in the transmission.

4. The printer-and-storage integrated system, according to claim 1, wherein the controller includes an authentication unit which authenticates an access to the printer or the storage device by the host device based on authentication information previously set for a user of the host device.

5. The printer-and-storage integrated system, according to claim 4, wherein the controller includes an authentication information memory which stores the authentication information.

6. The printer-and-storage integrated system, according to claim 1, wherein the controller is in a casing of either the printer or the storage device.

* * * * *